(12) United States Patent
Youngblood (10) Patent No.: US 7,167,557 B2
(45) Date of Patent: Jan. 23, 2007

(54) SUBSCRIBER LINE INTERFACE CIRCUIT (SLIC) INCLUDING A TRANSIENT OUTPUT CURRENT LIMIT CIRCUIT AND RELATED METHOD

(75) Inventor: Douglas Lawton Youngblood, Palm Bay, FL (US)

(73) Assignee: Intersil Americas Inc., Irvine, CA (US)

( * ) Notice: Subject to any disclaimer, the term of this patent is extended or adjusted under 35 U.S.C. 154(b) by 706 days.

(21) Appl. No.: 09/909,183

(22) Filed: Jul. 19, 2001

(65) Prior Publication Data

US 2002/0126833 A1  Sep. 12, 2002

Related U.S. Application Data

(60) Provisional application No. 60/262,900, filed on Jan. 19, 2001.

(51) Int. Cl.
*H04M 19/00* (2006.01)
(52) U.S. Cl. .................................. 379/399.01; 379/413
(58) Field of Classification Search ................ 323/311, 323/312, 315; 379/395.01, 413, 401, 322, 379/323, 324
See application file for complete search history.

(56) References Cited

U.S. PATENT DOCUMENTS

| 4,008,418 A | | 2/1977 | Murphy ........................ 361/18 |
| 4,485,341 A | | 11/1984 | Welty et al. ................. 323/315 |
| 5,596,637 A | * | 1/1997 | Pasetti et al. .......... 379/399.02 |
| 5,854,839 A | * | 12/1998 | Chen et al. .................. 379/413 |

OTHER PUBLICATIONS

Phillips, The HC-5502X/4X Telephone Subscriber Line Interface Circuits (SLIC), Jan. 1997, p. 4-1-4-17.

* cited by examiner

*Primary Examiner*—Sinh Tran
*Assistant Examiner*—Walter F Briney, III
(74) *Attorney, Agent, or Firm*—Akerman Senterfitt; Neil R. Jetter (57) ABSTRACT

A subscriber line interface circuit (SLIC) for a subscriber loop includes a pair of output amplifiers for connection to the subscriber loop and a transient output current limit circuit. The transient output current limit circuit may have at least one programmable output current limit and limit respective output currents from the pair of output amplifiers based thereon. The transient output current limit circuit may limit both source and sink currents for each of the pair of output amplifiers.

16 Claims, 7 Drawing Sheets

SUBSCRIBER LINE INTERFACE CIRCUIT (SLIC) INCLUDING A TRANSIENT OUTPUT CURRENT LIMIT CIRCUIT AND RELATED METHOD

RELATED APPLICATION

The present application is based upon co-pending provisional application Ser. No. 60/262,900 filed Jan. 19, 2001, which is hereby incorporated herein in its entirety by reference.

FIELD OF THE INVENTION

The present invention relates to the field of electronic circuits, and, more particularly, to subscriber line interface circuits (SLICs).

BACKGROUND OF THE INVENTION

A telephone network typically includes numerous switch offices which may be connected together via transmission lines, wireless links, etc. Central switching offices are connected to individual local telephone subscribers by subscriber loops. Each loop includes tip and ring wires carrying signals from the switch office to the telephone and from the telephone to the central office. A subscriber line interface circuit (SLIC) is typically used as the primary interface between the subscriber loop and the central office. Among other functions, the SLIC provides a direct current (DC) voltage from a battery source to the subscriber loop when the phone is on-hook. This DC voltage is used to detect when the subscriber telephone is off-hook as well as provide power to the circuits within the telephone itself. When the subscriber is on-hook, this voltage ranges from −42V to −60V, but is typically −48V.

The resistance of the subscriber loop increases with the distance the telephone is located from the switch office. This may cause excessive current to flow on shorter subscriber loops, particularly transient currents which occur when the telephone first goes off-hook and during ringing and loop start. This may have undesirable effects on power supplies, particularly in wireless local loop (WLL) and digitally added main line (DAML) applications where the SLIC circuit is located on the subscriber's premises rather than at the switch office (i.e., the subscriber loop is very short).

One prior art method of limiting current is to sense current with a resistor and bipolar transistor connected together. The voltage applied to the base-emitter junction of the transistor is proportional to the current through the resistor. The collector terminal is typically connected to a current drive source that drives the current buffer to provide negative feedback when the transistor is turned on due to the current through the resistor. This style of current limiting is often used in the output stage of operational amplifiers. Class A style amplifiers use a single limiter circuit, while Class B and Class AB amplifiers often use a complementary pair of limiter circuits, as will be understood by those of skill in the art.

There are several drawbacks to current limiting an op amp when it is constructed as an integrated circuit. The first is temperature variation. In an integrated circuit, resistors and transistors often have opposite temperature coefficients, causing large variations over the temperature range over which the circuit is used. The second drawback is the variation caused by unrelated process variations. The materials used to construct the transistor are often unrelated to that of the resistor, again causing large variations in the limit current of the circuit. The third drawback to this style of the circuit is the loss of dynamic range of the op amp. Since the circuit is in series with the output driver transistors, the voltage drop caused by the resistor reduces the voltage range capability to drive signals to a load.

Another prior art device disclosed in U.S. Pat. No. 4,771,228 to Hester et al. entitled "Output Stage Current Limit Circuit" uses a scaled version of the output current to drive the resistor in the circuit mentioned above. This current limit circuit splits the output current into two components and uses one of them to sense the value of the output current. This portion of the output current can be accurately split using the mirroring effect of like transistors, and has the added advantage of not reducing the dynamic range of the amplifier. In this configuration, the current that is split is used to drive a resistor and transistor in the same manner as in the above circuit. Yet, this current limit circuit may also suffer from variations due to temperature and process parameters.

Still another prior art approach to limiting current on a subscriber loop is disclosed in U.S. Pat. No. 4,485,341 to Welty et al. entitled "Current Limiter Circuit." This patent discloses a circuit for limiting the magnitude of current sourced from a first load circuit to a second load circuit to a predetermined value. The circuit includes a current sourcing circuit for sourcing current from the first load circuit to the second and a feedback circuit which is responsive to the magnitude of the current sourced to the second load circuit reaching the predetermined value. The feedback circuit supplies any additional current that the second load may require while inhibiting additional current from being sourced from the first load.

One limitation of SLICs including such prior art current limiters is that it may be relatively difficult to use such SLICs for multiple applications due to the varying currents that may be present in such applications. For example, the off-hook DC voltage applied to a subscriber loop typically varies from about −24V to −100V depending upon the application and the status of the subscriber loop. Further, greater ringer equivalent numbers (REN) may be needed in certain applications, resulting in a corresponding decrease in resistance. As such, DC voiceband currents, ring trip currents, etc. may vary widely depending upon the application. Thus, a single prior art SLIC may not be easily interchangeable between multiple applications since there may be no ready way to adjust the current thresholds for the given application.

Another limitation of such prior art current limiting devices is that they do not allow for both sourcing and sinking of current. As a result, such circuits may not allow the system to reach a steady state quick enough to adequately protect against extreme transient events, such as a short circuit ground fault or battery fault condition.

SUMMARY OF THE INVENTION

In view of the foregoing background, it is therefore an object of the invention to provide a SLIC including a transient current limit circuit that has relatively easily programmable current limits and provides for current sourcing and sinking.

This and other objects, features, and advantages in accordance with the present invention are provided by a SLIC including a pair of output amplifiers for connection to the subscriber loop and a transient output current limit circuit. The transient output current limit circuit may have at least one programmable output current limit, and limit respective output currents from the pair of output amplifiers based thereon.

More particularly, the transient output current limit circuit may limit both source and sink currents for each of the pair of output amplifiers. Further, the transient output current limit circuit may generate a source current limit and a sink current limit based upon the at least one programmable current limit. The sink current limit may be offset a predetermined amount higher than the source current limit, e.g., 40% higher than the source current limit. Alternatively, the at least one programmable output current limit may include a programmable sink current limit and a programmable source current limit.

The transient output current limit circuit may include a reference current generator for generating a reference current based upon the at least one programmable output current limit. The transient output current limit circuit may also include source and sink comparators for comparing sensed source and sink output currents for each of the output amplifiers with the reference current. Furthermore, respective source and sink prescalers may be connected to the source and sink comparators. Additionally, the transient output current limit circuit may further include at least one transconductance stage connected between the source and sink comparators and the pair of output amplifiers.

The at least one programmable output current limit may be programmed by connecting a programming resistor between a reference voltage and the reference current generator. Also, the reference current generator may include a temperature stabilized voltage reference source. The SLIC may further include a direct current (DC) loop current limit circuit for limiting current on the subscriber loop to a DC current limit. Moreover, the at least one programmable output current limit may be higher than the DC current limit. For example, the at least one programmable output current limit may be less than about 50% higher than the DC current limit A method aspect of the invention is for limiting current on a subscriber loop. The method may include connecting a pair of output amplifiers to the subscriber loop, programming at least one output current limit, and limiting currents from the pair of output amplifiers based upon the at least one programmable output current limit.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
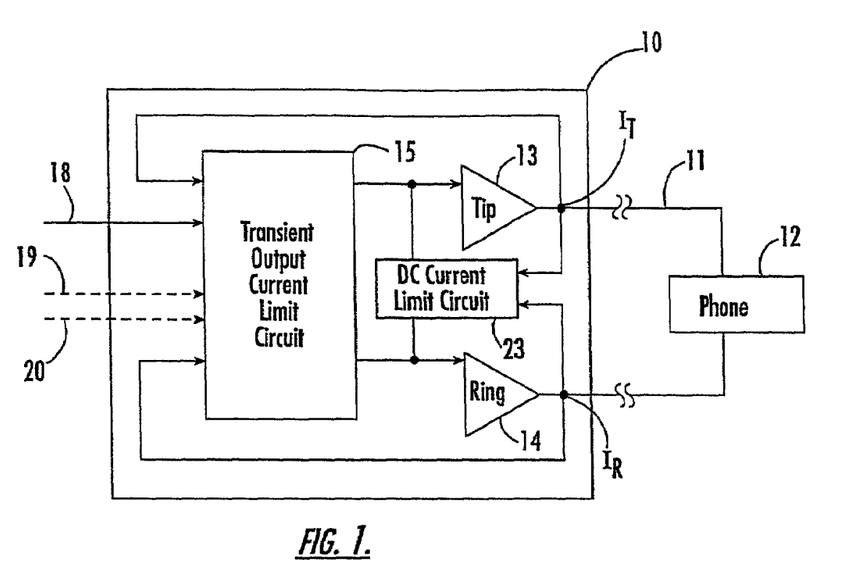
FIG. 1 is a schematic block diagram of a subscriber line interface circuit (SLIC) including a transient current limit circuit according to the invention.

Referring now to the schematic block diagram of FIG. 1, a subscriber line interface circuit (SLIC) 10 according to the invention is connected via a subscriber loop 11 to a telephone 12. The SLIC 10 includes a pair of tip and ring output amplifiers 13, 14 for connection to the subscriber loop 11 and a direct current (DC) loop current limit circuit 23 for limiting current on the subscriber loop to a DC current limit. The DC loop current limit circuit 23 establishes the DC current limit when the phone 12 is off-hook. Yet, as noted above, transient events may occur when the phone 12 first goes off-hook or during ringing and loop start, for example. This may cause transient currents that will not be suppressed by the DC loop current limit circuit 23 because it has not yet been engaged.

According to the invention, a transient output current limit circuit 15 may be included in the SLIC 10 to reduce such transient currents. The transient output current limit circuit 15 is illustratively connected to the outputs of the output amplifiers 13, 14 and receives respective currents $I_T$, $I_R$ therefrom. The transient output current limit circuit 15 has at least one programmable output current limit which may be set externally via an input 18. The transient output current limit circuit 15 limits currents from the pair of output amplifiers 13, 14 based upon the at least one programmable output current limit.

More specifically, the transient output current limit circuit 15 limits both source and sink currents for each of the output amplifiers 13, 14. The transient output current limit circuit 15 may generate a source current limit and a sink current limit based upon the at least one programmable current limit. Furthermore, the transient output current limit circuit 15 may generate the sink current limit to be offset a predetermined amount higher than the source current limit. For example, the transient output current limit circuit 15 may use the programmable current limit as the source current limit, and generate the sink current limit to be the predetermined amount higher than the source current limit.

This is done to prevent the output amplifiers 13, 14 from sinking and sourcing at the same time which may otherwise cause undesirable current oscillations on the subscriber loop, as will be appreciated by those of skill the art. The predetermined amount may be less than about 40% higher than the source current limit, and is preferably about 20% higher. Of course, it may not be necessary to generate different source and sink current limits for all applications, and it should be understood that the same current limit may be used for both sourcing and sinking according to the invention.

Using a single programmable current limit is advantageous in that the user need only program a single current limit and the transient output current limit circuit 15 will generate the source and sink current limits therefrom. Of course, both a programmable sink current limit and a programmable source current limit may be set externally via inputs 19, 20 rather than having the transient output current limit circuit 15 internally generate these limits. Those of skill in the art will appreciate that numerous other alternatives for setting the source and sink current limits are also contemplated by the invention. An example of programming of the current limit will be described further below.

Figure 2:
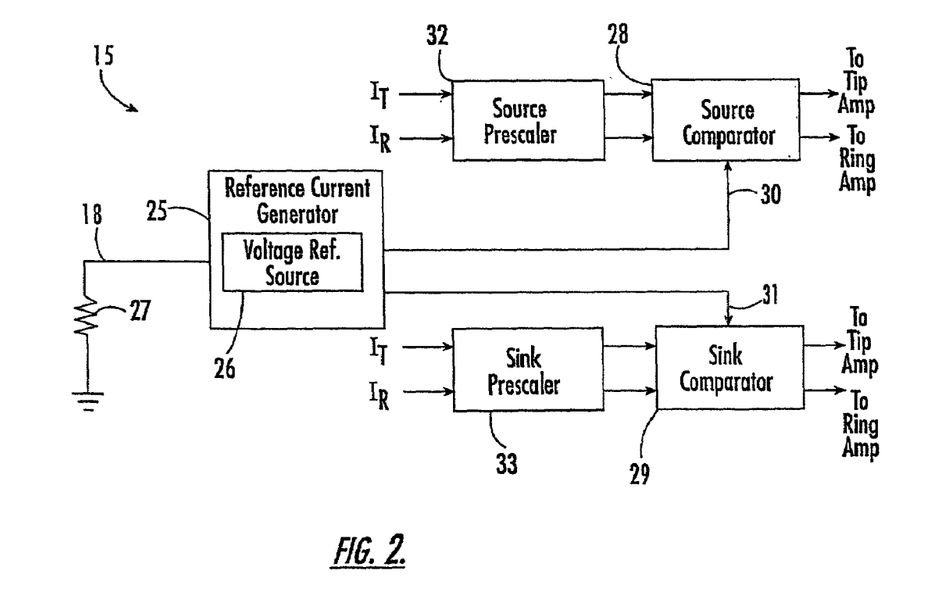
FIG. 2 is a schematic block diagram of the transient current limit circuit of FIG. 1.

Referring now to FIG. 2, the transient output current limit circuit 15 includes a reference current generator 25 for generating a reference current based upon the programmable output current limit. Of course, as noted above, both source and sink reference currents may be generated by the reference current generator 25 offset by a predetermined value, if desired. The reference current generator 25 may include a temperature stabilized voltage reference source 26 to provide enhanced temperature stability, as will be appreciated by those of skill in the art. Other suitable voltage sources may also be used.

Source and sink comparators 28, 29 compare sensed source and sink output currents for each of the output amplifiers 13, 14 with the reference current, and control the source and sink currents of the output amplifiers when the reference current is exceeded. Again, separate source and sink reference currents may be used, as illustrated in FIG. 2, in which the source and sink comparators 28, 29 receive the source and sink reference currents via lines 30, 31, respectively. Source and sink prescalers 32, 33 are connected to the source and sink comparators and sense the source and sink currents for each of the output amplifiers 13, 14.

The programmable output current limit may be programmed by connecting a programming resistor 27 between a reference voltage (e.g., ground) and the reference current generator 25. Of course, other suitable programming devices may also be used in accordance with the invention, as will be appreciated by those of skill in the art. Advantageously, the programming resistor 27 may be located externally to the SLIC 10 so that the current limit(s) for a given application may be easily set by the user during installation. Thus, a single SLIC 10 according to the invention may be used in numerous applications by simply programming the desired current limit for the given application.

By way of example, the above described transient output current limit circuit 15 has been incorporated into the HC55185 family of ringing SLICs (RSLICs) and the ISL5586 family of low power ringing SLICs for home gateways, both of which are made by the Intersil Corporation, assignee of the present invention. Further details regarding these SLICs may be found in the HC55185 Data Sheet from the Intersil Corporation, published February 2001, and the ISL5586 Data sheet from the Intersil Corporation, published June 2001, which are both hereby incorporated herein in their entirety by reference. In the HC55185 application, for example, the sink current limit is internally set by the transient output current limit circuit 15 to be 20% higher than the source current limit, which is programmed by the user. The source current limit is determined by the equation $$R_P = \frac{1780}{I_{SRC}}, \qquad (1)$$

where $R_P$ is the programming resistor 27 and $I_{SRC}$ is the source current limit. Thus, to set a source current limit of 50 mA, a 35.6 kΩ programming resistor 27 would be used. Accordingly, for a 20% offset, the sink current limit will be set by the transient output current limit circuit 15 to be $$I_{SNK} = 1.20 \times I_{SRC}, \qquad (2)$$

where $I_{SNK}$ is the sink current limit. Thus, if the source current limit is set to be 50 mA, the sink current limit will be 60 mA. Again, numerous other predetermined offsets are possible according to the invention, and the source and sink current limits may alternatively both be set externally to the transient output current limit circuit 15, as noted above.

Those of skill in the art will be able to program appropriate current limits for the SLIC 10 based upon the various application in which the SLIC is to be used. Generally speaking, it is desirable to make the programable output current limit higher than the DC current limit so that the DC current limit circuit 23 will be able to take over control of the current limiting from the transient output current limit circuit 15 when the phone 12 goes off-hook.

Additionally, typical ringing SLIC circuits detect an off-hook condition during ringing or "ring-trip" by checking for a ringing current threshold. Thus, if the ringing current threshold is higher than the DC current limit in a particular application, it is preferable to have the programmable output current limit be higher than the ringing current threshold as well. Of course, it is desirable to have the programmable output current limit as low as possible to reduce power consumption but without affecting the DC current limit or ring-trip detection functions. Generally speaking, the programmable output current limit may be less than about 50% higher than the DC current limit (or ring current threshold), though other values may also be used according to the invention.

Figure 3A:
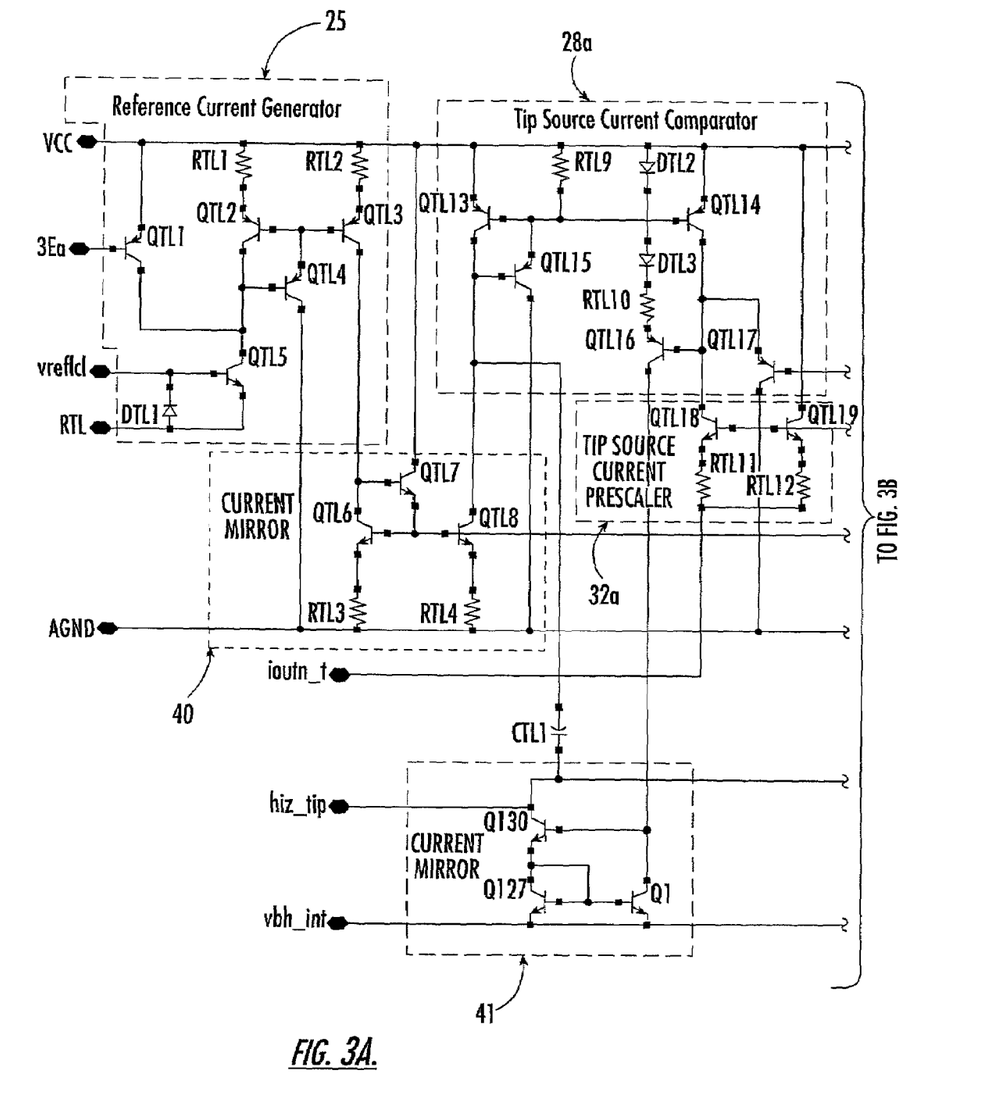
FIG. 3 is a more detailed schematic diagram of an embodiment of the transient current limit circuit of FIG. 2.
Figure 3B:
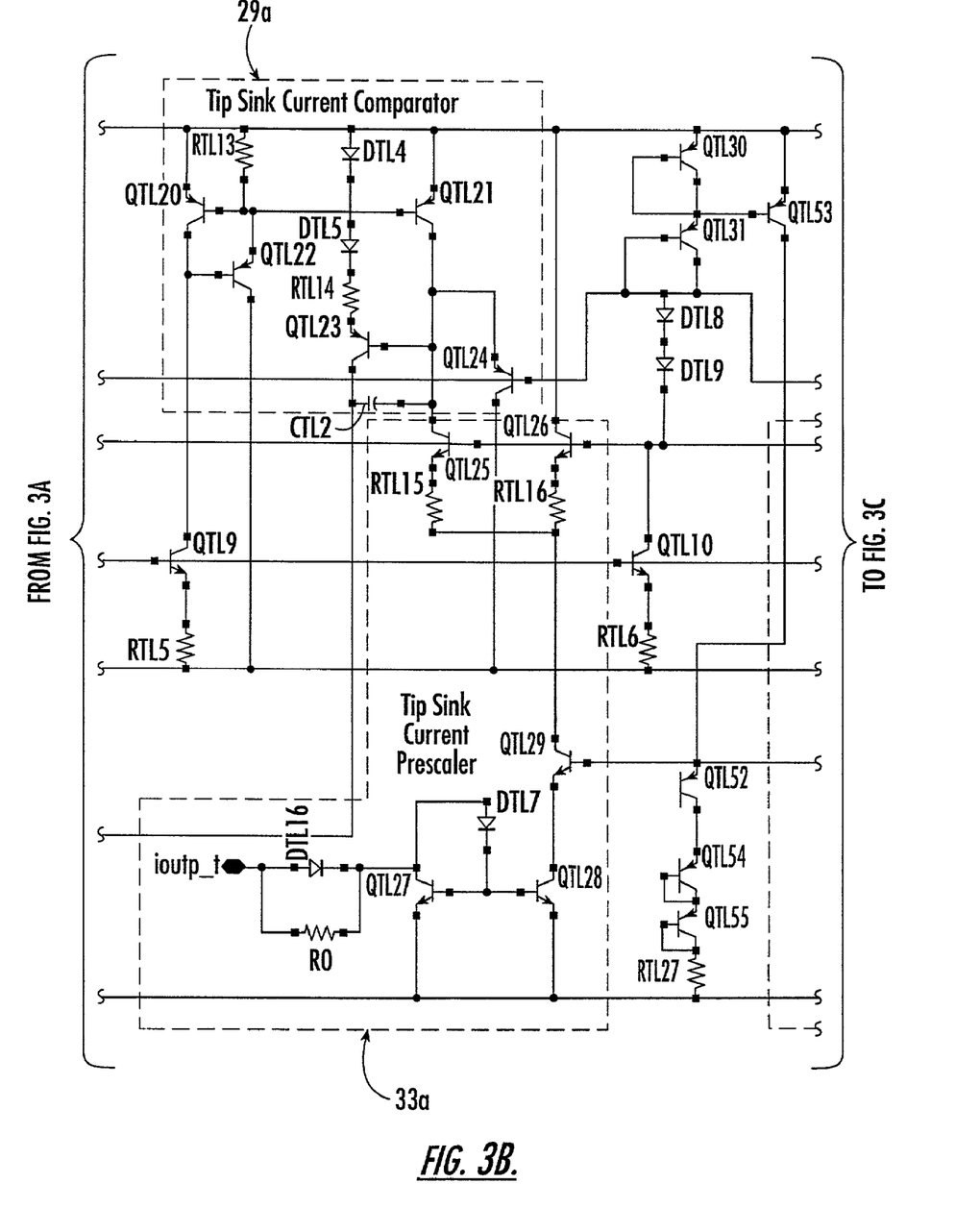
Figure 3C:
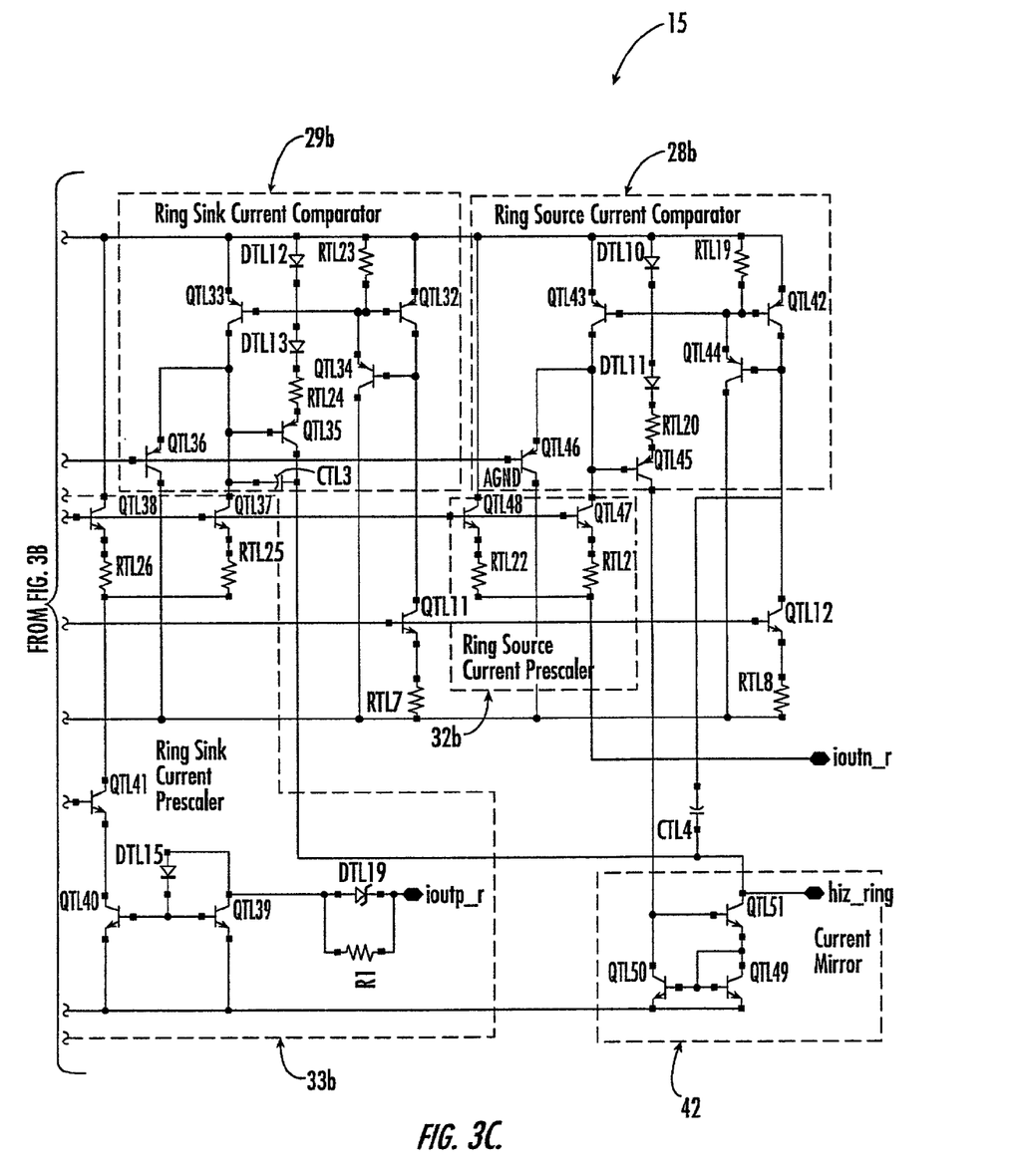

A detailed embodiment of the transient output current limit circuit 15 may be seen in the schematic diagram of FIG. 3. In this embodiment, the transient output current limit circuit 15 includes individual source and sink comparators 28a, 29a for the tip amplifier 13 and individual source and sink comparators 28b, 29b for the ring amplifier 14. Associated therewith are respective tip source and sink current prescalers 32a, 33a and ring source and sink current prescalers 32b, 33b.

More specifically, the tip source comparator 28a includes transistors QTL13–QTL17, resistors RTL9–RTL10, and diodes DTL2–DTL3. For clarity of explanation, the tip source comparator 28a may conceptually be divided into a current comparator section including the transistors QTL13–QTL15, QTL17, and the resistor RTL9, and a transconductance stage including the transistor QTL16, resistor RTL10, and diodes DTL2–STL3. The transconductance stage drives the high impedance node of the tip amplifier 13.

The tip sink comparator 29a includes transistors QTL20–QTL24, resistors RTL13–RTL14, diodes DTL4–DTL5, and a capacitor CTL2. The ring source comparator 28b includes transistors QTL42–QTL46, resistors RTL19–RTL20, and diodes DTL10–DTL11. The ring sink comparator 29b includes transistors QTL32–QTL36 resistors RTL23–RTL24, diodes DTL12–DTL13, and a capacitor CTL3. The tip sink comparator 29a, ring source comparator 28b, and ring sink comparator 29b may also be conceptually divided into a current comparator section and transconductance stage similar to the tip source comparator 28a, as will be appreciated by those of skill in the art.

Moreover, the tip source current prescaler 32a includes transistors QTL18–QTL19 and resistors RTL11–RTL12. The tip sink current prescaler 33a includes transistors QTL25–QTL29, resistors R0 and RTL15–RTL16, and diodes DTL7 and DTL16. The ring source current prescaler 32b includes transistors QTL47–QTL48 and resistors RTL21–RTL22. The ring sink current prescaler 33b includes transistors QTL37–QTL41, resistors R1 and RTL25–RTL26, and diodes DTL15 and DTL19 (Zener). Also, the reference current generator 25 includes QTL1–QTL5, RTL1–RTL2, and a diode DTL1.

The transient output current limit circuit 15 further includes current mirrors 40–42. The outputs hiz_tip and hiz_ring of the current mirrors 41, 42 are connected to respective high impedance input nodes of the tip and ring amplifiers 13, 14. Once the sensed source and sink currents exceed the reference current threshold level, the current comparator output drives the transconductance stage to, in turn, drive current to the high impedance nodes of the output amplifiers 13, 14 via the respective outputs hiz_tip and hiz_ring with the proper polarity to provide negative feedback. This reduces the voltage drive to the load and therefore reduces the output current. As noted above, both sourcing and sinking may be limited. This may be particularly desirable for Class AB type output stages, as will be appreciated by those of skill in the art.

The prescalers 32a, 32b, 33a, 33b sense the respective sink and source currents by splitting the currents input thereto from the respective output amplifiers 13, 14 using two transistors with parallel base and emitter connections, namely QTL18, QTL19 for the prescaler 32a; QTL25, QTL26 for the prescaler 33a; QTL37, QTL38 for the prescaler 33b; and QTL47, QTL48 for the prescaler 32b. For each prescaler 32a, 32b, 33a, 33b, the current will split between the two transistors by the ratio of their respective sizes. Generally, there may be a large device and a small device. The collector of the large device connects to a power supply or ground (i.e., QTL19, QTL26, QTL38, and QTL48). The collector of the small device (i.e., QTL18, QTL25, QTL37, and QTL47) is fed to the respective comparator 28a, 28b, 29a, 29b. The current flowing into the respective comparator 28a, 28b, 29a, 29b is thus a precision attenuated replica of the output current from the respective tip or ring amplifier 13, 14.

The current mirror 40 includes transistors QTL6–QTL8 and resistors RTL3–RTL4. The current mirror 41 includes transistors Q1, Q127 and Q130, and the current mirror 42 similarly includes transistor QTL49–QTL51. Various interconnection circuitry is also included in the transient output current limit circuit 15, such as transistors QTL9–QTL12, QTL30–QTL31, and QTL52–QTL55; resistors RTL5–RTL8 and RTL27; capacitors CTL1 and CTL4; and diodes DTL8–DTL9.

Figure 4A:
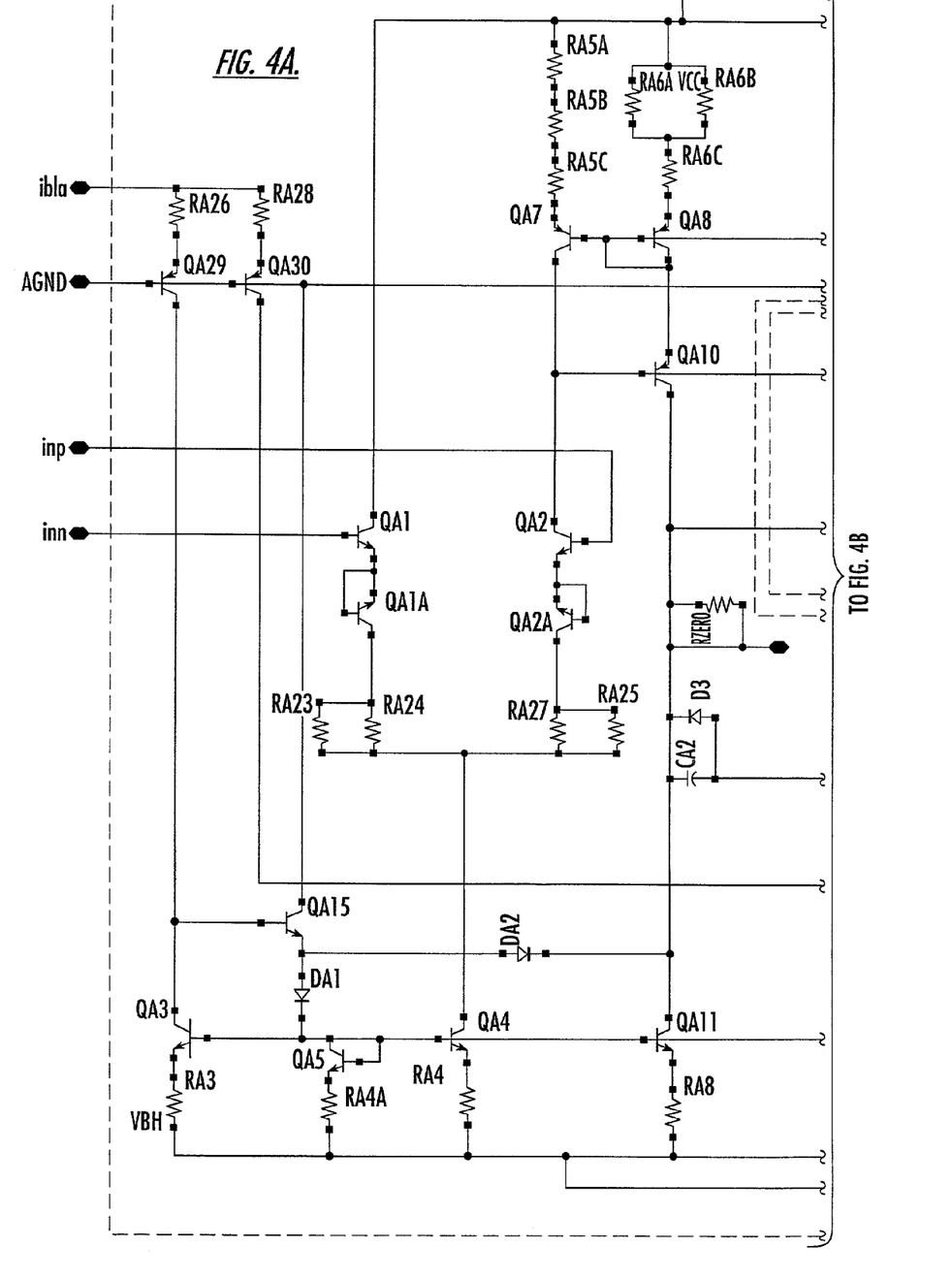
FIG. 4 is a more detailed schematic diagram of the tip and ring amplifiers of FIG. 1.
Figure 4B:
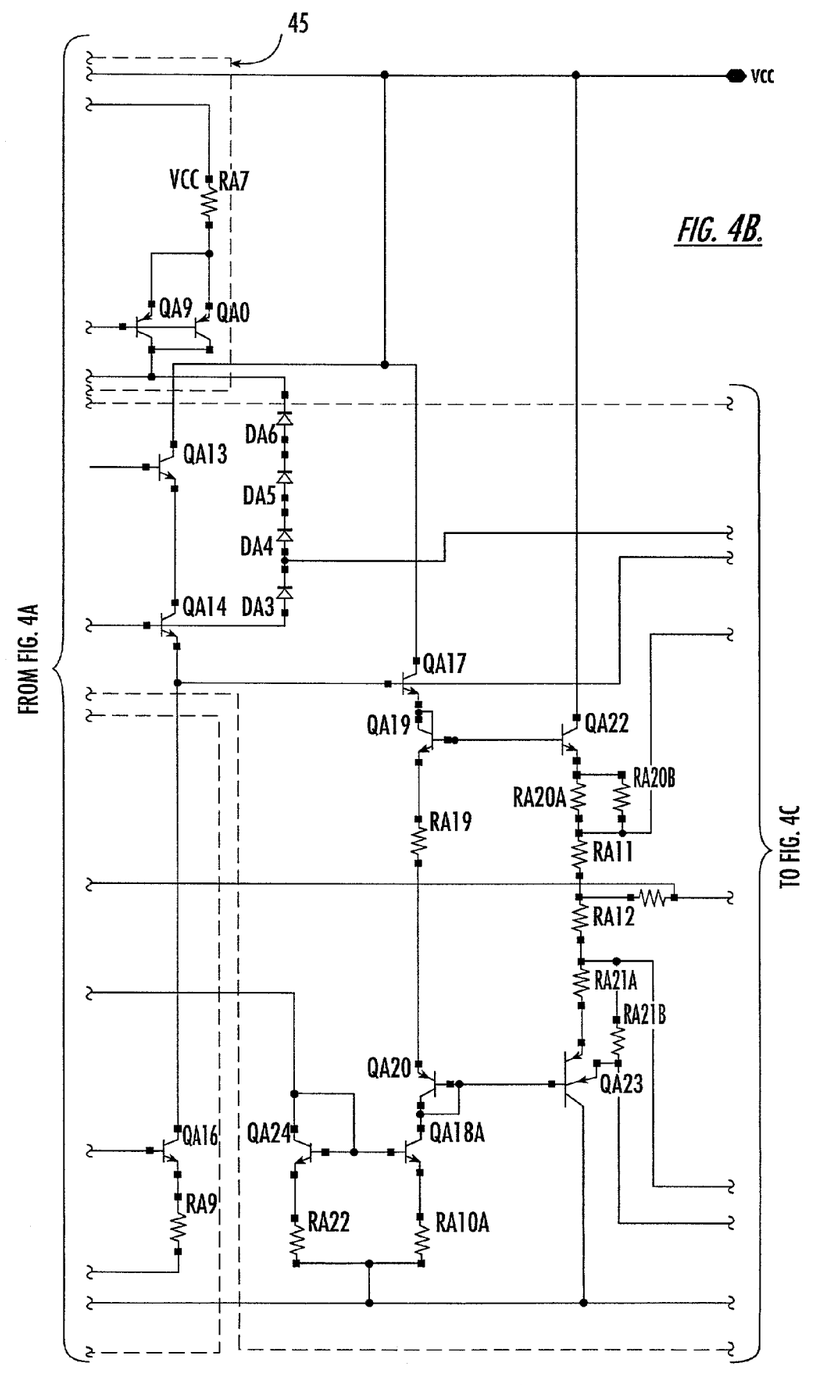
Figure 4C:
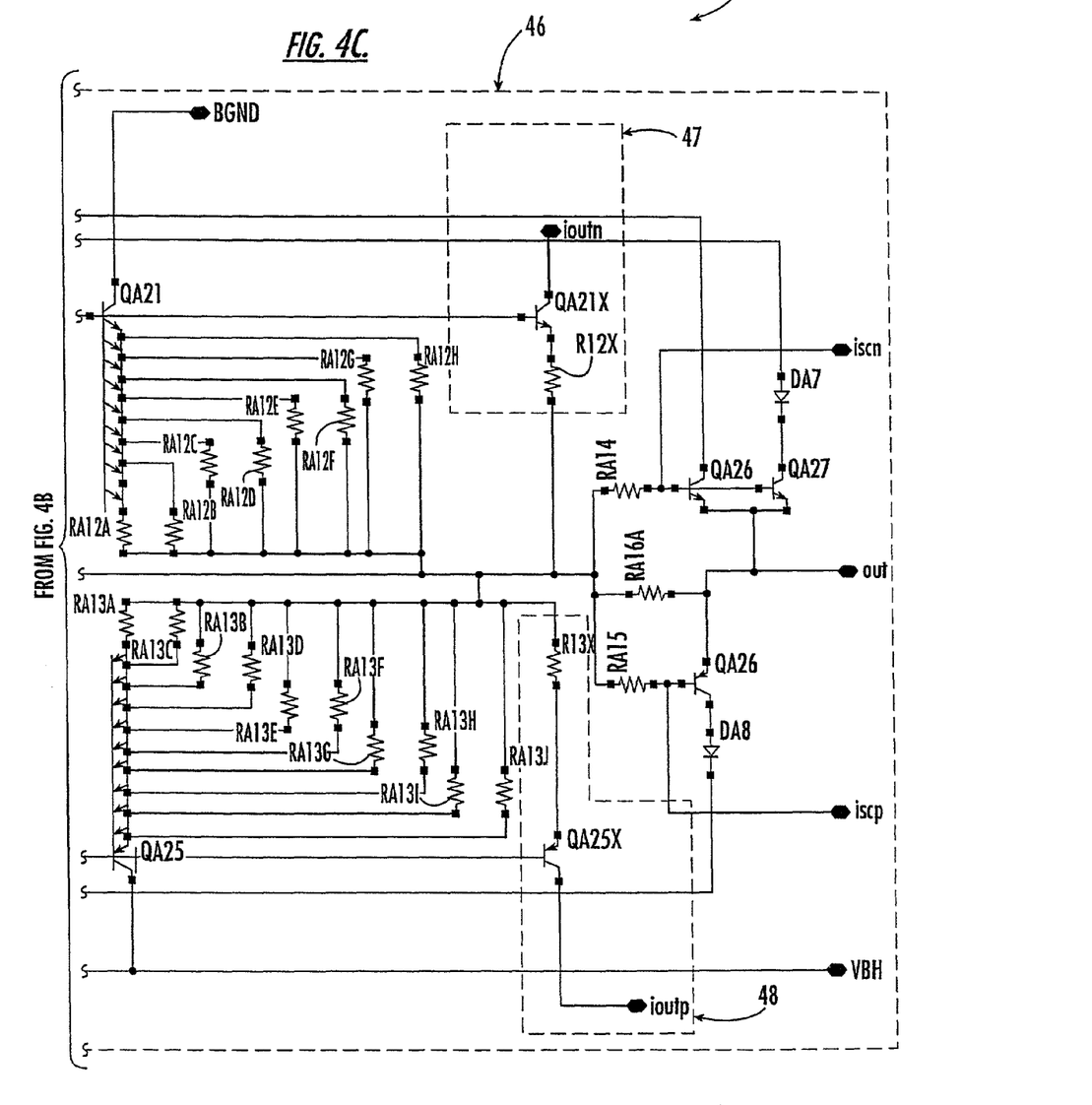

An example of an operational amplifier 43 that may be used for the output amplifiers 13, 14 is shown schematically in FIG. 4. Generally speaking, the amplifier 43 includes a differential input to single ended output amplifier 45 and an output buffer 46. The output buffer 46 may include output source and sink current sense sections 47, 48 which provide the source and sink current outputs to the transient output current limit circuit 15. Advantageously, the output source and sink current sense sections 47, 48 may optionally be used to provide additional prescaling, though other amplifiers may also be used in accordance with the present invention that do not provide prescaling.

More specifically, the differential input to single ended output amplifier 45 includes transistors QA0, QA1, QA1A, QA2, QA2A, QA3–QA5, QA7–QA11, QA15–QA16, QA29–30; resistors R-ZERO, RA3–RA4, RA5A–RA5C, RA6A–RA6C, RA7–RA9, and RA23–RA28; capacitor CA2; and diodes DA1, DA2, and D3. Moreover, the output buffer 46 includes transistors QA13–QA14, QA17, QA18A, QA19–QA21, QA22–QA25, QA26–QA27; resistors RA10A, RA11–RA12, RA12A–RA12H, RA13A–RA13J, RA14–RA15, RA16A, RA19, RA20A–RA20B, RA21A–RA21B, RA22; and diodes DA3–DA8. The output source current sense section 47 includes a transistor QA21X and a resistor R12X, while the output sink current sense section 48 includes a transistor QA25X and a resistor R13X.

Of course, those of skill in the art will appreciate that the transient output current limit circuit 15 of the present invention may be used in numerous applications in addition to SLICs. For example, the transient output current limit circuit 15 is particularly well suited for applications in which precise operational amplifier output current limiting is desired. The circuit described herein may generally used with the output stage of an operational amplifier to limit the current that is driven into a load resistance. More particularly, numerous applications exist in which amplifiers are used to voltage drive low impedance outputs with which the transient output limit circuit 15may be used, as will be appreciated by those of skill in the art. Other applications for which the transient output current limit circuit 15may be used include, for example, voltage amplifier circuits.

Thus, the transient output current limit circuit 15may be more generally used according to the invention for limiting current from an amplifier, for example. The transient output current limit circuit 15 may include a reference current generator 25for generating at least one reference current based upon at least one programmable output current limit, respective source and sink prescalers 32, 33for sensing source and sink output currents for the amplifier, and respective source and sink comparators 28, 29for comparing the sensed source and sink output currents with the reference current, as described above. The operation of such a transient output current limit circuit 15is similar to that described above and will not be discussed further herein.

A method aspect of the invention is for limiting current on a subscriber loop 11.The method may include connecting a pair of output amplifiers 13, 14 to the subscriber loop, programming at least one output current limit, and limiting currents from the pair of output amplifiers based upon the at least one programmable output current limit, as previously described above.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A subscriber line interface circuit (SLIC) comprising:
a tip amplifier having a tip amplifier output that couples a tip amplifier output current to a tip portion of a subscriber loop;
a ring amplifier having a ring amplifier output that couples a ring amplifier output current to a ring portion of said subscriber loop;
a tip amplifier transient output current limit circuit, which is operative to monitor said tip amplifier output current individually for both tip source and tip sink currents, and to controllably limit said tip amplifier output current for both said tip source and tip sink currents, exclusive and irrespective of said ring amplifier output current, in accordance with at least one programmable tip amplifier output current limit therefor; and
a ring amplifier transient output current limit circuit, which is operative to monitor said ring amplifier output current individually for both ring source and ring sink currents, and to controllably limit said ring amplifier output current for both said ring source and ring sink currents, exclusive and irrespective of said tip amplifier output current, in accordance with at least one programmable ring amplifier output current limit therefor.

2. The SLIC according to claim 1, wherein both said tip source and tip sink current limits are programmable limits and both said ring source and ring sink current limits are programmable limits.

3. The SLIC according to claim 2, wherein said programmable tip amplifier sink current limit is higher than said programmable tip amplifier source current limit, and wherein said programmable ring amplifier sink current limit is higher than said programmable ring amplifier source current limit.

4. The SLIC according to claim 3, wherein said programmable tip amplifier sink current limit is on the order of twenty percent higher than said programmable tip amplifier source current limit, and wherein said programmable ring amplifier sink current limit is on the order of twenty percent higher than said programmable ring amplifier source current limit.

5. The SLIC according to claim 1, further including
a direct current (DC) limit circuit, coupled to said tip amplifier output and said ring amplifier output, and being operative to limit DC current through said subscriber loop to a prescribed DC current limit; and wherein
said programmable no amplifier output current limit is higher than said prescribed DC current limit, and said programmable ring amplifier output current limit circuit is higher than said prescribed DC current limit.

6. The SLIC according to claim 5, wherein said programmable tip amplifier output current limit is on the order of but less than fifty percent higher than said prescribed DC current limit, and wherein said programmable ring amplifier output current limit is on the order of but less than fifty percent higher than said prescribed DC current limit.

7. A subscriber line interface circuit (SLIC) comprising:
a tip amplifier having a tip amplifier output that couples a tip amplifier output current to a tip portion of a subscriber loop;
a ring amplifier having a ring amplifier output that couples a ring amplifier output current to a ring portion of said subscriber loop;
a direct current (DC) limit circuit, coupled to said tip amplifier output and said ring amplifier output, and being operative to limit DC current through said subscriber loop to a prescribed DC current limit;
a tip amplifier transient output current limit circuit, which is operative to monitor said tip amplifier output current individually for both tip source and tip sink currents, and to controllably limit said tip amplifier output current for both said tip source and tip sink currents, exclusive and irrespective of said ring amplifier output current, in accordance with at least one programmable tip amplifier output current limit therefor; and
a ring amplifier output current limit circuit, which is operative to monitor said ring amplifier output current individually for both ring source and ring sink currents, and to controllably limit said ring amplifier output current for both said ring source and ring sink currents, exclusive and irrespective of said tip amplifier output current, in accordance with at least one programmable ring amplifier output current limit therefor.

8. The SLIC according to claim 7, wherein both said rip source and tip sink current limits are programmable limits and both said ring source and ring sink current limits are programmable limits.

9. The SLIC according to claim 8, wherein said programmable tip amplifier sink current limit is higher than said programmable tip amplifier source current limit, and wherein said programmable ring amplifier sink current limit is higher than said programmable ring amplifier source current limit.

10. The SLIC according to claim 9, wherein said programmable tip amplifier sink current limit is on the order of twenty percent higher than said programmable tip amplifier source current limit, and wherein said programmable ring amplifier sink current limit is on the order of twenty percent higher than said programmable ring amplifier source current limit.

11. A method for limiting a tip amplifier output current applied by a tip amplifier of a subscriber line interface circuit (SLIC) to a tip portion of a subscriber loop, and for limiting a ring amplifier output current applied by a ring amplifier of said SLIC to a ring portion of said subscriber loop, comprising the steps of:
(a) monitoring said tip amplifier output current individually for both tip source and tip sink currents, and to controllably limit said tip amplifier output current for bath said rip source and tip sink currents exclusive and irrespective of said ring amplifier output current, in accordance with at least one programmable tip amplifier output current limit therefor, and
(b) monitoring said ring amplifier output current individually for both ring source and ring source current, and to controllably limit said ring amplifier output current for both said ring source and ring sink currents exclusive and irrespective of said tip amplifier output current, in accordance with at least one programmable ring amplifier output current limit therefor.

12. The method according to claim 11, wherein both said tip source and tip sink current limits are programmable limits and both said ring source and ring sink current limits are programmable limits.

13. The method according to claim 12, wherein said programmable tip amplifier sink current limit is higher than said programmable tip amplifier source current limit, and wherein said programmable ring amplifier sink current limit is higher than said programmable ring amplifier source current limit.

14. The method according to claim 13, wherein said programmable tip amplifier sink current limit is on the order of twenty percent higher than said programmable tip amplifier source current limit, and wherein said programmable ring amplifier sink current limit is on the order of twenty percent higher than said programmable ring amplifier source current limit.

15. The method according to claim 11, further including the step of:
(c) limiting DC current through said subscriber loop to a prescribed DC current limit, and wherein
step (a) comprises controllably limiting at least one of said tip source and tip sink current in accordance with said at least one programmable tip amplifier output current limit which is higher than said prescribed DC current limit, and
step (b) comprises controllably limiting at least one of said ring source and ring sink current in accordance with said at least one programmable ring amplifier output current limit which is higher than said prescribed DC current limit.

16. The method according to claim 15, wherein said programmable tip amplifier transient output current limit is on the order of but less than fifty percent higher than said prescribed DC current limit, and wherein said programmable ring amplifier transient output current limit is on the order of but less than fifty percent higher than said prescribed DC current limit.

* * * * *

UNITED STATES PATENT AND TRADEMARK OFFICE
CERTIFICATE OF CORRECTION

PATENT NO. : 7,167,557 B2  Page 1 of 1
APPLICATION NO. : 09/909183
DATED : January 23, 2007
INVENTOR(S) : YoungBlood It is certified that error appears in the above-identified patent and that said Letters Patent is hereby corrected as shown below:

In the claims:

Claim 5, column 9, line 20, delete "no" and add --tip--.
Claim 8, column 9, line 58, delete "rip" and add --tip--.
Claim 11, column 10, line 17, delete "bath" and add --both--.
Claim 11, column 10, line 17, delete "rip" and add --tip--.
Claim 11, column 10, line 22, delete "source current" and add --sink currents--.
Claim 11, column 10, line 24, after "currents", add --,--.

Signed and Sealed this

Tenth Day of April, 2007

JON W. DUDAS
*Director of the United States Patent and Trademark Office*